United States Patent [19]

Klawitter

[11] Patent Number: 4,918,834
[45] Date of Patent: Apr. 24, 1990

[54] ENVELOPE FOR PROTECTING DISASSEMBLED STATOR COIL

[75] Inventor: Daniel Klawitter, Fond du Lac, Wis.

[73] Assignee: Brunswick Corporation, Skokie, Ill.

[21] Appl. No.: 297,990

[22] Filed: Jan. 17, 1989

[51] Int. Cl.$^5$ .................. B23P 19/04; B65D 33/16
[52] U.S. Cl. .................................... 29/722; 29/700;
206/349; 383/86
[58] Field of Search .................. 29/156.4 R, 700, 722,
29/729, 760; 206/349; 383/84, 86, 86.1, 86.2, 99

[56] References Cited

U.S. PATENT DOCUMENTS

| | | | |
|---|---|---|---|
| 781,668 | 2/1905 | Lombard | 383/86 X |
| 2,635,788 | 4/1953 | Snyder et al. | 383/86 X |
| 2,754,868 | 7/1956 | Manis | 383/99 X |
| 2,945,138 | 7/1960 | Strang . | |
| 3,105,474 | 10/1963 | Kiekhaefer . | |
| 3,321,126 | 5/1967 | Rivman et al. | 383/86 X |
| 3,937,200 | 2/1976 | Sleder et al. . | |
| 4,093,906 | 6/1978 | Draxler . | |
| 4,160,435 | 7/1979 | Sleder . | |
| 4,325,350 | 4/1982 | Bauer et al. . | |
| 4,418,677 | 12/1983 | Hofmann . | |
| 4,421,150 | 12/1983 | Masters | 383/86 X |
| 4,468,811 | 8/1984 | Shaw et al. | 383/84 X |
| 4,570,792 | 2/1986 | Conway | 383/86 X |

FOREIGN PATENT DOCUMENTS 380638 9/1964 Switzerland ........................ 383/86

OTHER PUBLICATIONS

Mercury Marine Parts Catalog 90-132-92, Aug. 1985, pp. 6, 7, 22, 23, 28, 29.
Mercury Marine Service Manual Models V-135 thru V-225, Parts Catalog 90-97658-3, 1988, pp. 2A-6 thru 2A-9.

Primary Examiner—Mark Rosenbaum
Assistant Examiner—Peter D. B. Vo
Attorney, Agent, or Firm—Andrus, Sceales, Starke & Sawall

[57] ABSTRACT

A repair aid and method is provided for a two-cycle marine engine (10) having a stator coil (16) dangling by electrical wires (22) during repair of the engine and subject to damage and abrasion. The stator coil is inserted into a protective envelope (24) which is closed around the stator coil, with the wires extending outwardly therefrom and remaining attached to the engine such that the envelope is retained on the stator coil to provide protection during repair.

12 Claims, 2 Drawing Sheets

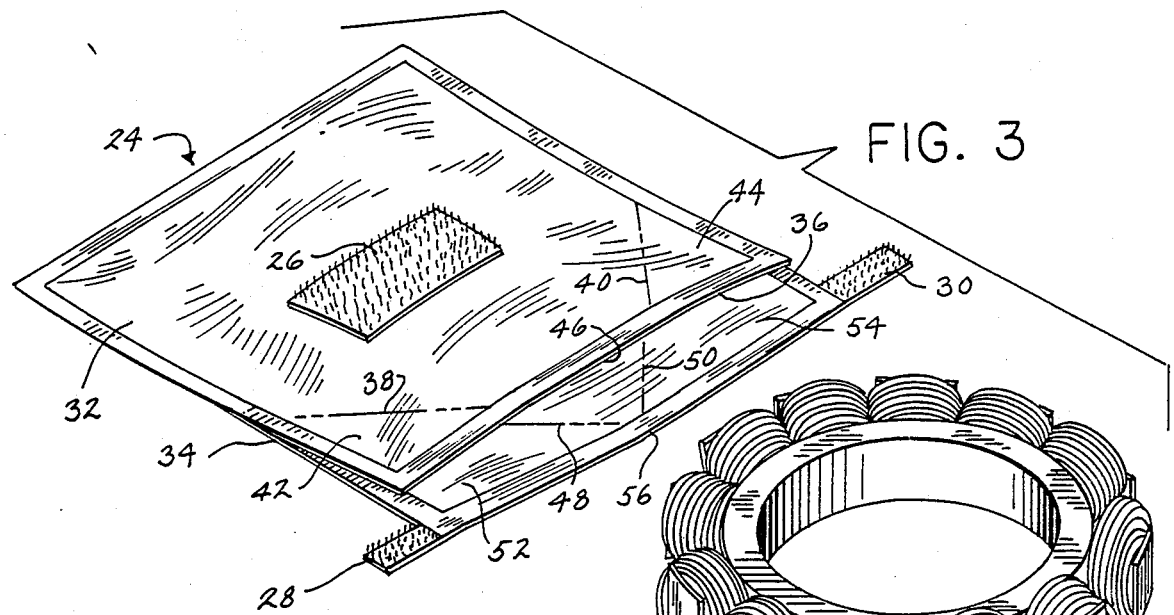
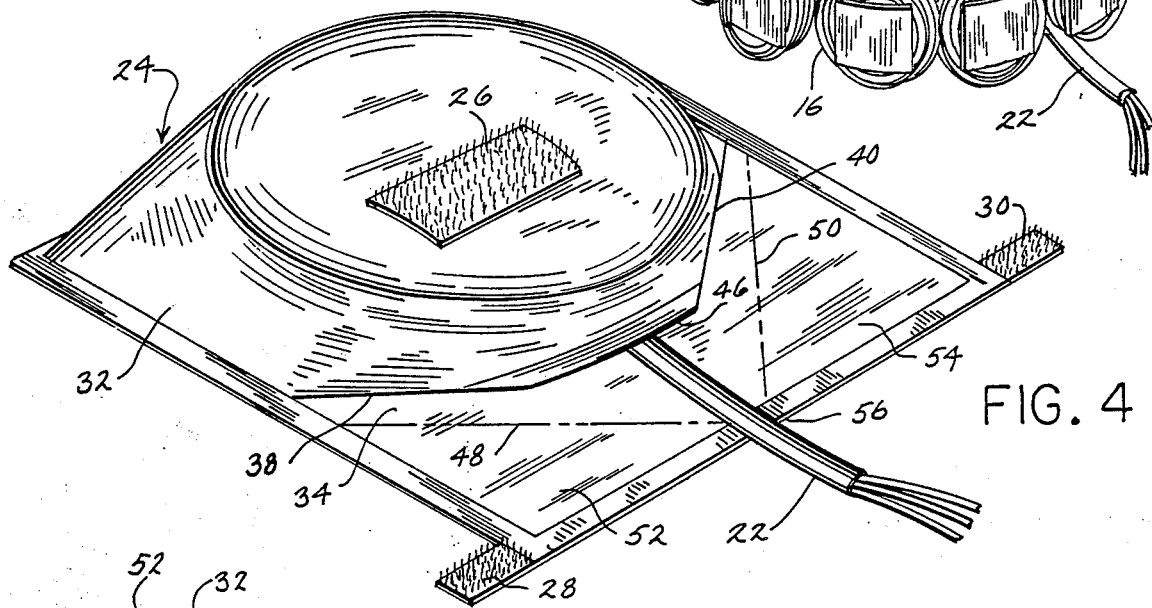
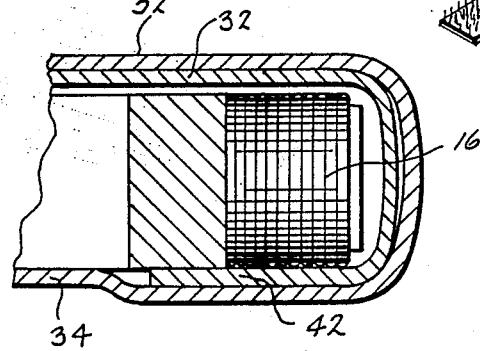
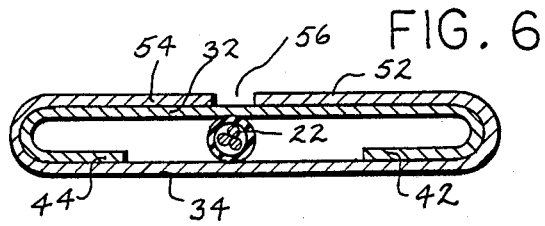

ENVELOPE FOR PROTECTING DISASSEMBLED STATOR COIL

BACKGROUND AND SUMMARY

The invention relates to two-cycle internal combustion marine engines, and more particularly to protection of the stator coil during engine repairs.

A two-cycle internal combustion marine engine has a crankshaft extending through a crankcase and an alternator stator coil. The stator coil has electrical wires connected to the engine. During repair of the engine, the stator coil is typically removed from the crankshaft, but it is desirable to leave the wires connected to the engine in order to simplify the repair process by eliminating the associated disconnection and reconnection steps otherwise required for such wires. After removal of the stator coil from the crankshaft, and with the electrical wires remaining connected to the engine, the stator coil then dangles from the engine by such electrical wires.

The engine is typically mounted on a repair stand, supported on a workbench or the like, or is upright on the back of the boat. As the engine is moved or rotated during the repair sequence, the dangling stator coil may strike parts of the engine or the repair stand or the floor or the workbench, etc. This may damage the stator coil windings and cause a short.

The present invention addresses and solves the above noted problem of stator coil damage during engine repair. The invention protects the stator coil during repair with a simple envelope enclosure which is readily installed and removed, and which is reusable. Simplicity of installation and removal encourages use. This in turn increases the chances of maintaining stator coil integrity during repair procedures. The envelope may also be used as a shipping container, and be later discarded.

BRIEF DESCRIPTION OF THE DRAWINGS

FIG. 3 is an exploded perspective view of a stator coil and envelope.

FIG. 4 is a view showing partial folding of the envelope of FIG. 3 with the stator coil therein.

FIG. 5 is a sectional view taken along line 5—5 of FIG. 2.

FIG. 6 is a sectional view taken along line 6—6 of FIG. 2.

DETAILED DESCRIPTION

Figure 1:
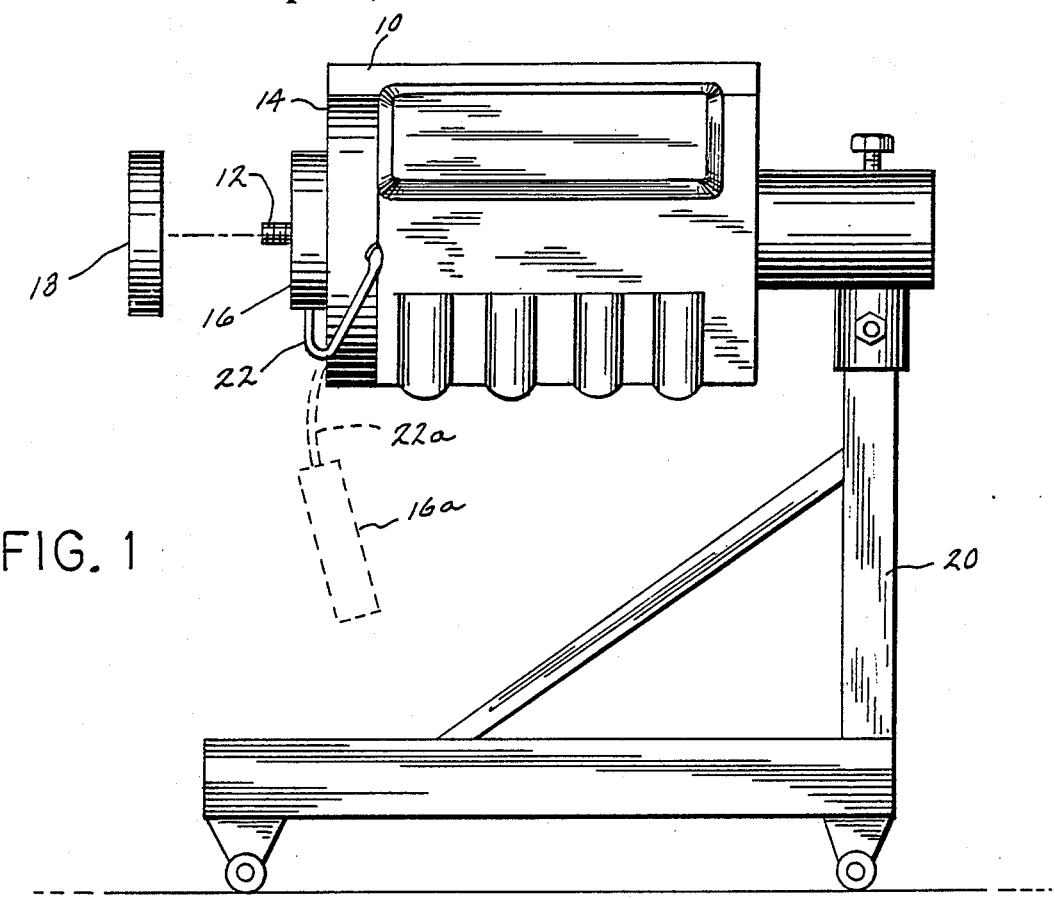
FIG. 1 is a side elevation view schematically showing a marine engine on a repair stand.

FIG. 1 shows a two-cycle internal combustion marine engine 10 having a crankshaft 12 extending through a crankcase 14 and an alternator stator coil 16, and having a flywheel 18 mounted on the end thereof, all as is known in the art, and for which further reference may be had to U.S. Pats. 4,418,677, 4,325,350, 4,160,435, 4,093,906, 3,937,200, 3,105,474, 2,945,138, incorporated herein by reference, and for example as shown in Mercury Marine Parts Catalog 9013292, Aug. 1985, pages 6, 7, 22, 23, 28, 29, and Mercury Marine Service Manual Models V-135 thru V-225, Parts Catalog 90-97658-3, 1988, pages 2A-6 thru 2A-9. The engine is mounted on a repair stand 20 which typically allows tilting or rotation of the engines along various axes for various repair procedures. In other procedures, the engine is merely supported on the floor or on a workbench. During repair, flywheel 18 is removed from crankshaft 12, followed by removal of stator coil 16 from the crankshaft.

In some repair procedures, it is desired to leave the stator coil wires 22 connected to the engine, to save time and effort of disconnection and subsequent reconnection. The stator coil then dangles from the engine, as shown at dashed line position 16a and dashed line wires 22a. This in turn subjects the stator coil and windings to possible damage, such as nicks, cuts, scratches, gouges, etc., as the engine is moved or rotated, because the dangling coil may strike parts of engine 10 or stand 20 or the floor, etc. Also, the dangling connection subjects the coil to damage when the engine is supported on the floor or on a workbench, etc.

Figure 2:
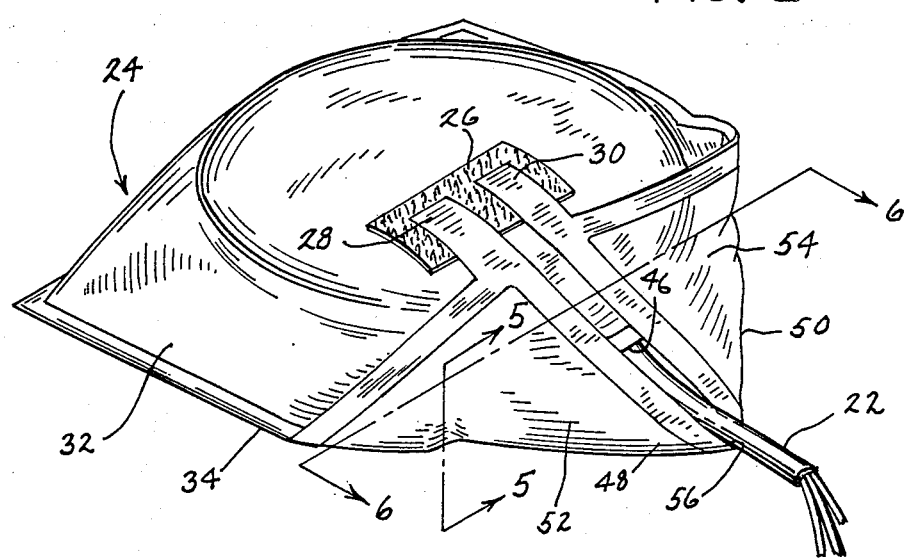
FIG. 2 shows a stator envelope in accordance with the invention, with a stator coil therein.

In the present invention, stator coil 16 is placed in a protective envelope 24, FIGS. 2 and 3, to protect the stator coil from damage and abrasion during movement of the engine during repair while stator coil 16 dangles from the engine by wires 22, as shown at 22a, FIG. 1, and is subject to striking miscellaneous objects in the immediate vicinity, as noted above. The envelope also protects the stator coil when on a workbench or stored on a shelf, etc. The envelope is closed, with wires 22 extending outwardly therefrom and remaining attached to the engine such that the envelope is retained on the stator coil to provide protection during repair. The envelope is closed at fasteners 26, 28, 30 to enclose the stator coil, and to retain the envelope on the stator coil. The fasteners are hook and loop type fasteners, for example as known under the trademark VELCRO, snaps, or other suitable attachment or closure structure. The envelope is opened following the engine repair, and the stator coil is removed from the envelope and replaced on the crankshaft.

Envelope 24 is a canvas or the like material and has a frontwall 32 and a backwall 34 forming an open-topped pocket 36 therebetween, FIG. 3, receiving stator coil 16. Frontwall 32 has an upper flap folded over stator coil 16 along fold lines 38 and 40 forming first and second folded flap portions 42 and 44 defining a slit 46 therebetween through which wires 22 extend outwardly, FIG. 4. Backwall 34 has an upper flap folded over the folded flap of the frontwall and over stator coil 16 along fold lines 48 and 50 forming folded flap portions 52 and 54 defining a slit or opening 56 therebetween, FIG. 2, through which wires 22 extend outwardly.

Flap portion 42, FIGS. 3 and 5, extends over and around stator coil 16 and engages backwall 34 of the envelope and is trapped and held between backwall 34 and the backside of stator coil 16 during folding of flap portion 52 of backwall 34 of the envelope. Flap portion 44 extends over and around stator coil 16 and engages backwall 34 of the envelope and is trapped and held between backwall 34 and the backside of the stator coil during folding of flap portion 54 of backwall 34 of the envelope. Velcro fastener 28 on flap portion 52 attaches flap portion 52 to frontwall 32 of the envelope at velcro fastener 26 thereon. Velcro fastener 30 on flap portion 54 attaches flap portion 54 to frontwall 32 of the envelope at velcro fastener 26. Fold lines 48 and 50 intersect at a 90° angle, and wires 22 exit the envelope at such intersection at slit 56. Projections of fold lines 38 and 40 intersect at a 90° angle substantially at the intersection of fold lines 48 and 50. Fold line 38 is parallel to fold line 48, and fold line 40 is parallel to fold line 50. The slit or gap 56 between folded flap portions 52 and 54 is aligned with the slit or gap 46 between folded flap portions 42 and 44. The outer edge of slit 56 is spaced outwardly of slit 46. Slit 46 is wider than slit 56.

It is recognized that various equivalents, alternatives and modifications are possible within the scope of the appended claims.

I claim:

1. A repair aid for a two-cycle internal combustion engine having a crankshaft extending through a crankcase and through an alternator stator coil, said stator coil having electrical wires connected to said engine, said stator coil being removed from said crankshaft during repair to said engine and being subject to damage and abrasion during movement of said engine during repair while said stator coil dangles from said engine by said wires and is subject to striking miscellaneous objects in the immediate vicinity, said repair aid comprising a protective envelope enveloping said stator coil and having an opening therein through which said electrical wires pass such that said stator coil remains connected to said engine by said wires during said repair, wherein said protective envelope comprises a first portion enabling insertion of said stator coil with said wires attached and extending outwardly therefrom, and a second portion movable to close said first portion with said wires still extending outwardly therefrom to permit said stator coil to remain attached to said engine by said wires, and protect and envelope said stator coil during repair of said engine without requiring removal of said wires from said engine, wherein said first portion of said envelope is a pocket, and said second portion of said envelope is a flap extending from said pocket and folded back onto said pocket with said stator coil therein and leaving an opening through which said wires extend, wherein said flap is folded along a pair of fold lines forming first and second folded flap portions defining a slit therebetween through which said wires extend, wherein said fold lines are on a single said flap in a single plane.

2. The invention according to claim 1 wherein said fold lines intersect at a 90° angle, and said wires exit said envelope at said intersection.

3. A repair aid for a two-cycle internal combustion marine engine having a crankshaft extending through a crankcase and through an alternator stator coil, said stator coil having electrical wires connected to said engine, said stator coil being removed from said crankshaft during repair to said engine and being subject to damage and abrasion during movement of said engine during repair while said stator coil dangles from said engine by said wires and is subject to stricking miscellaneous objects in the immediate vicinity, said repair aid comprising a protective envelope comprising a frontwall and a backwall forming an open topped pocket therebetween receiving said stator coil therein, said frontwall having an upper flap folded over said stator coil along first and second fold lines forming first and second folded flap portions defining a first slit therebetween through which said wires extend outwardly, said first and second fold lines and said upper flap of said frontwall all being coplanar, said backwall having an upper flap folded over said folded flap of said frontwall and over said stator coil along third and fourth fold lines forming third and fourth folded flap portions defining a second slit therebetween through which said wires extend outwardly, said third and fourth fold lines and said upper flap of said backwall all being coplanar.

4. The invention according to claim 3 wherein said first flap portion extends over and around said stator coil and engages said backwall of said envelope and is trapped and held between said backwall and the backside of said stator coil during folding of said third flap portion, and wherein said second flap portion extends over and around said stator coil and engages said backwall of said envelope and is trapped and held between said backwall and the backside of said stator coil during folding of said fourth flap portion.

5. The invention according to claim 4 comprising reusable attachment means attaching said third and fourth flap portions to said frontwall of said envelope.

6. The invention according to claim 4 wherein said first fold line is parallel to said third fold line, and wherein said second fold line is parallel to said fourth fold line.

7. The invention according to claim 4 wherein said first slit is wider than said second slit.

8. The invention according to claim 4 wherein said third and fourth fold lines intersect at a 90° angle, and said wires exit said envelope at said intersection.

9. The invention according to claim 8 wherein projections of said first and second fold lines intersect at a 90° angle substantially at the intersection of said third and fourth fold lines.

10. The invention according to claim 4 wherein said second slit is aligned with said first slit.

11. The invention according to claim 10 wherein the outer edge of said second slit is spaced outwardly of said first slit.

12. A repair aid for a two-cycle internal combustion marine engine having a crankshaft extending through a crankcase and through an alternator stator coil, said stator coil having electrical wires connected to said engine, said stator coil being removed from said crankshaft during repair to said engine and being subject to damage and abrasion during movement of said engine during repair while said stator coil dangles from said engine by said wires and is subject to striking miscellaneous objects in the immediate vicinity, said repair aid comprising a protective envelope comprising a frontwall and a backwall forming an open topped pocket therebetween receiving said stator coil therein, said frontwall and said blackwall having leading edges parallel to each other, the leading edge of said backwall being spaced farther from said stator coil then the leading edge of said frontwall in a pre-folded condition, said frontwall having an upper flap folded rearwardly over said stator coil along first and second fold lines forming first and second folded flap portions defining a first slit therebetween through which said wires extend outwardly, said first slit having a leading edge formed by said leading edge of said frontwall, said backwall having an upper flap folded forwardly over said folded flap of said frontwall and over said stator coil along third and fourth a second slit therebetween through which said wires extend outwardly, said second slit having a leading edge formed by said leading edge of said backwall, said wires extend radially outwardly from said stator coil rectilinearly through said first slit perpendicularly across said leading edge of said frontwall at said leading edge of said first slit, and continuing rectilinearly through said second slit perpendicularly across said leading edge of said backwall at said leading edge of said second slit.

* * * * *

UNITED STATES PATENT AND TRADEMARK OFFICE
CERTIFICATE OF CORRECTION

PATENT NO. : 4,918,834
DATED : April 24, 1990
INVENTOR(S) : DANIEL KLAWITTER

It is certified that error appears in the above-identified patent and that said Letters Patent is hereby corrected as shown below:

Claim 1, col. 3, line 27, after "therefrom" insert -- , --;

Claim 8, col. 4, line 24, after "wires" insert -- exit --;

Claim 12, col. 4, line 46, delete "blackwall" and substitute therefor -- backwall --; Claim 12, col. 4, line 58, after "fourth" insert -- fold lines forming third and fourth folded flap portions defining --.

Signed and Sealed this

Sixth Day of August, 1991

Attest:

HARRY F. MANBECK, JR.

*Attesting Officer*     *Commissioner of Patents and Trademarks*